United States Patent [19]
Brach et al.

[11] Patent Number: 5,239,559
[45] Date of Patent: Aug. 24, 1993

[54] TERMINATOR METHOD AND APPARATUS

[75] Inventors: William E. Brach, Lombard; William L. Zuckerman, Skokie, both of Ill.

[73] Assignee: Methode Electronics, Inc., Chicago, Ill.

[21] Appl. No.: 789,365

[22] Filed: Nov. 8, 1991

[51] Int. Cl.[5] .................. H04B 3/00; H04L 25/02
[52] U.S. Cl. .............................. 375/36; 333/17.2; 307/547
[58] Field of Search ............... 375/36, 99; 307/540, 307/542, 546, 547, 358; 333/17.1, 17.2

[56] References Cited
U.S. PATENT DOCUMENTS 3,758,868 9/1973 Brown ........................ 307/546 X
3,895,305 7/1975 Longman, Jr. ............... 307/546 X Primary Examiner—Curtis Kuntz
Assistant Examiner—Tesfaldet Bocure
Attorney, Agent, or Firm—Allegretti & Witcoff, Ltd.

[57] ABSTRACT

A terminator method and apparatus used with a SCSI bus line for removing noise spikes or transients from data and/or control signals received on the bus line include a voltage regulator, a low voltage regulating circuit, a plurality of pull-up termination resistors, and a suppression network. The voltage regulator is responsive to an input termination power supply voltage for generating a regulated output voltage of a predetermined value. The low voltage regulating circuit is responsive to the regulated output voltage for generating a reference voltage. The plurality of pull-up resistors is interconnected between the regulated output voltage and a plurality of data and/or control signal lines coupled to the bus line for generating termination impedances. The suppression network is interconnected between at least one of the plurality of data and/or control signal lines and the reference voltage for removing transients from the data and/or control signals by limiting the range of the upper voltage level and the lower voltage level appearing thereon.

19 Claims, 3 Drawing Sheets

TERMINATOR METHOD AND APPARATUS

BACKGROUND OF THE INVENTION

This invention relates generally to terminator devices and more particularly, it relates to an improved terminator method and apparatus used with a SCSI (acronym for small computer system interface) bus line for removing noise spikes or transients from data and/or control signals received on the bus line.

One application where reliable data transfer becomes important is in the field of data transmission on a fully loaded SCSI bus line for communication between a plurality of data drives and a central processing unit (CPU) in a small computer. The basic problem encountered when transferring data on the SCSI bus line is due to spurious or random narrow pulses referred generally to as transients or noise spikes appearing in a stream of data signals or on control signals. Since the data or control signal is essentially a plurality of pulses having either a high or low value, these transients may result in erroneous data acquisition, undesired triggering, or false signals to be generated.

The transients are more hazardous when they appear on the REQ and ACK signal lines. The control signals REQ and ACK are used to perform a "handshake" so as to transfer the data back and forth between a target (i.e., a disk drive) and an initiator (i.e., a host computer). For instance, a transient occurring in the control signal REQ may cause double strobing of the data. Also, the incorrect or wrong data may be transferred when an early control signal REQ occurs and the data signal lines have not yet completely settled.

As is generally known in the art of computer equipment manufacturing, a termination device is typically connected to each end of an OR-WIRED SCSI bus line for supplying a fixed supply voltage with a predetermined impedance. In FIG. 1, there is shown prior art termination networks 10 and 12 connected to the respective ends of the OR-WIRED SCSI bus line 14. Each of the termination networks 10, 12 includes a voltage divider formed of two resistors T1 and T2 connected in series. One end of the resistor T1 is connected to a power supply voltage TERMPWR, which is typically at +5.0 volts. One end of the resistor T2 is connected to a ground potential GND, which is typically at zero volts. The junction of the resistors T1 and T2 for the termination network 10 is connected to one end of the bus line 14, and the junction of the resistors T1 and T2 for the termination network 12 is connected to the other end of the bus line. For the SCSI bus line, the values of the resistors T1 are 220Ω and the values of the resistor T2 are 330Ω so as to provide approximately +3.0 volts at the junction points J1 and J2 when the bus line is not active.

The OR-WIRED SCSI bus line 14 has a plurality of transceivers 16a, 16b, and 16c which are connected thereto by respective signal lines 18a, 18b, and 18c. Each of the transceivers 16a-16c includes a transmitting device 20 having an open collector output (i.e., NAND logic gate type 7438) and a receiving device 22 (i.e., Schmitt trigger input type 7414). When the bus line is not active, the signal line (i.e., line 18a) is at a high or logic "1" level which has a voltage value of approximately +3.0 volts. A low or logic "0" level is obtained when an open collector output device is turned on so as to pull the voltage value on the signal line down to approximately zero volts (i.e., 0.2 volts through the driver transistor Q1).

While there are many different arrangements of the termination network that can be used to achieve the above results, there is a requirement of ANSI specification (X3T9.2/86-109REV10c) which states that any one termination network shall provide no more than a current of 24 mA during the logic "0" level. One such alternative arrangement is the prior art termination network 10a which is shown in FIG. 2. This alternative arrangement is referred to as a "regulated terminator" which includes a voltage regulator 24 for receiving the voltage TERMPWR on line Vin and for generating a regulated voltage on line Vout of approximately +2.85 volts with 110 ohms resistors to the respective 18 signal lines DB(0)–DB(7), ATN, BSY, ACK, RST, MSG, SEL, C/D, REQ and I/O. With the 110 ohms-resistors P1–P18 functioning as pull-up resistors, the maximum current requirement of the open collector driver transistor is met.

The principal unsolved problem of this prior art regulated terminator 10a was that it was still susceptible to noise spikes or transients appearing on the SCSI bus line. Further, it has been encountered in the computer equipment industry that there are more than 100 varieties of SCSI cables having impedances ranging between 45 ohms to 132 ohms. Thus, this prior art regulated terminator did not suggest or hint as to how it could accommodate the different types of SCSI cables.

It is also known in the prior art that a termination technique employing Schottky diodes may be used for reducing of line ringing. Such techniques are illustrated on pages 77–81 of a manual entitled "MECL System Design Handbook" published by Motorola, Inc. of Schaumburg, Ill. A typical diode termination circuit obtained from this manual is illustrated in FIG. 3. However, it should be apparent that such diode termination circuit is not even remotely concerned with the problems associated with a termination network, i.e., providing a fixed voltage with a termination resistor so as to meet the maximum current requirements previously discussed.

Accordingly, there has arisen a need in the computer equipment industry for an improved terminator apparatus for removing noise spikes or transients occurring in the control signals REQ and ACK on the SCSI bus line so as to provide reliable and accurate data transmission. It would also be expedient that the terminator apparatus be capable of being readily modified so as to accommodate a range of SCSI cable impedances.

SUMMARY OF THE INVENTION

Accordingly, it is a general object of the present invention to provide an improved terminator method and apparatus for removing transients occurring in the data and/or control signals which is relatively simple and economical to manufacture and assemble.

It is an object of the present invention to provide an improved terminator apparatus for removing noise spikes or transients occurring in the control and/or data signals on the SCSI bus line so as to provide reliable accurate and data transmission.

It is another object of the present invention to provide an improved terminator apparatus which includes a voltage regulator, a low voltage regulating circuit, a plurality of pull-up termination resistors, and a transient suppression network.

It is still another object of the present invention to provide a terminator method used with an SCSI bus line for removing noise spikes from data and/or control signals transferred on the bus line.

In accordance with these aims and objectives, the present invention is concerned with the provision of a terminator method and apparatus used with SCSI bus line for removing noise spikes or transients from data and/or control signals received on the bus line. The terminator apparatus includes a voltage regulator which is responsive to an input termination power supply voltage for generating a regulated output voltage of a predetermined value. A low voltage regulating circuit is responsive to the regulated output voltage for generating a reference voltage. Resistors are interconnected between the regulated output voltage and a plurality of data and/or control signal lines coupled to the bus line for generating termination impedances. A suppression network is interconnected between at least one of the plurality of data and/or control signal lines and the reference voltage for removing transients from the at least one signal line by limiting the range of the upper voltage level and the lower voltage level appearing thereon.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
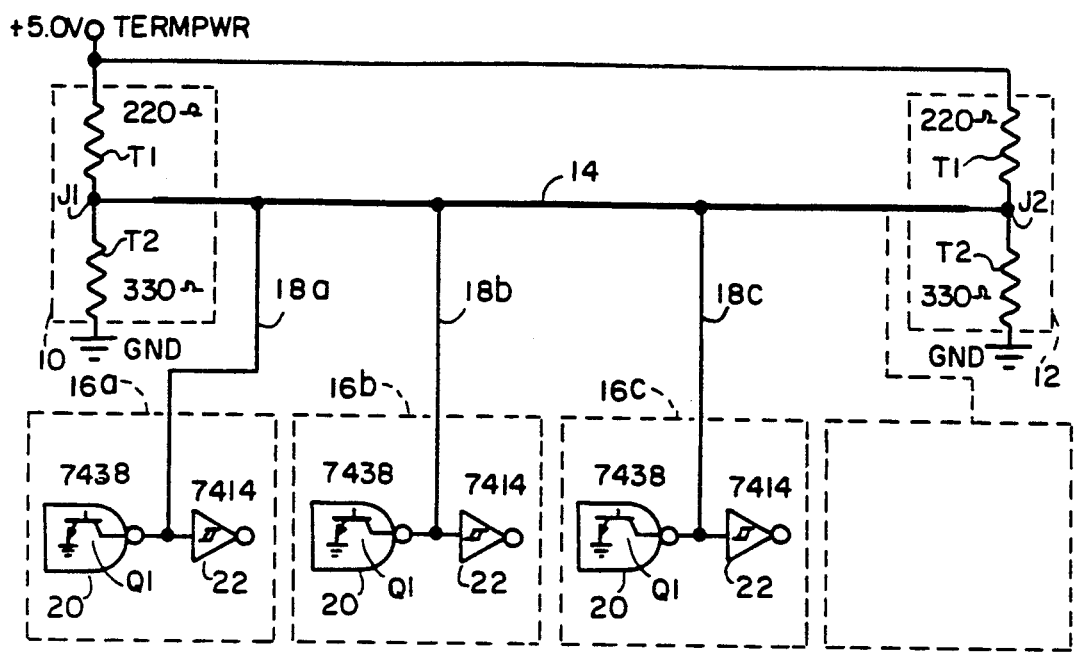
FIG. 1 illustrates prior art terminator networks connected to the respective ends of an OR-WIRED SCSI bus line.
Figure 4:
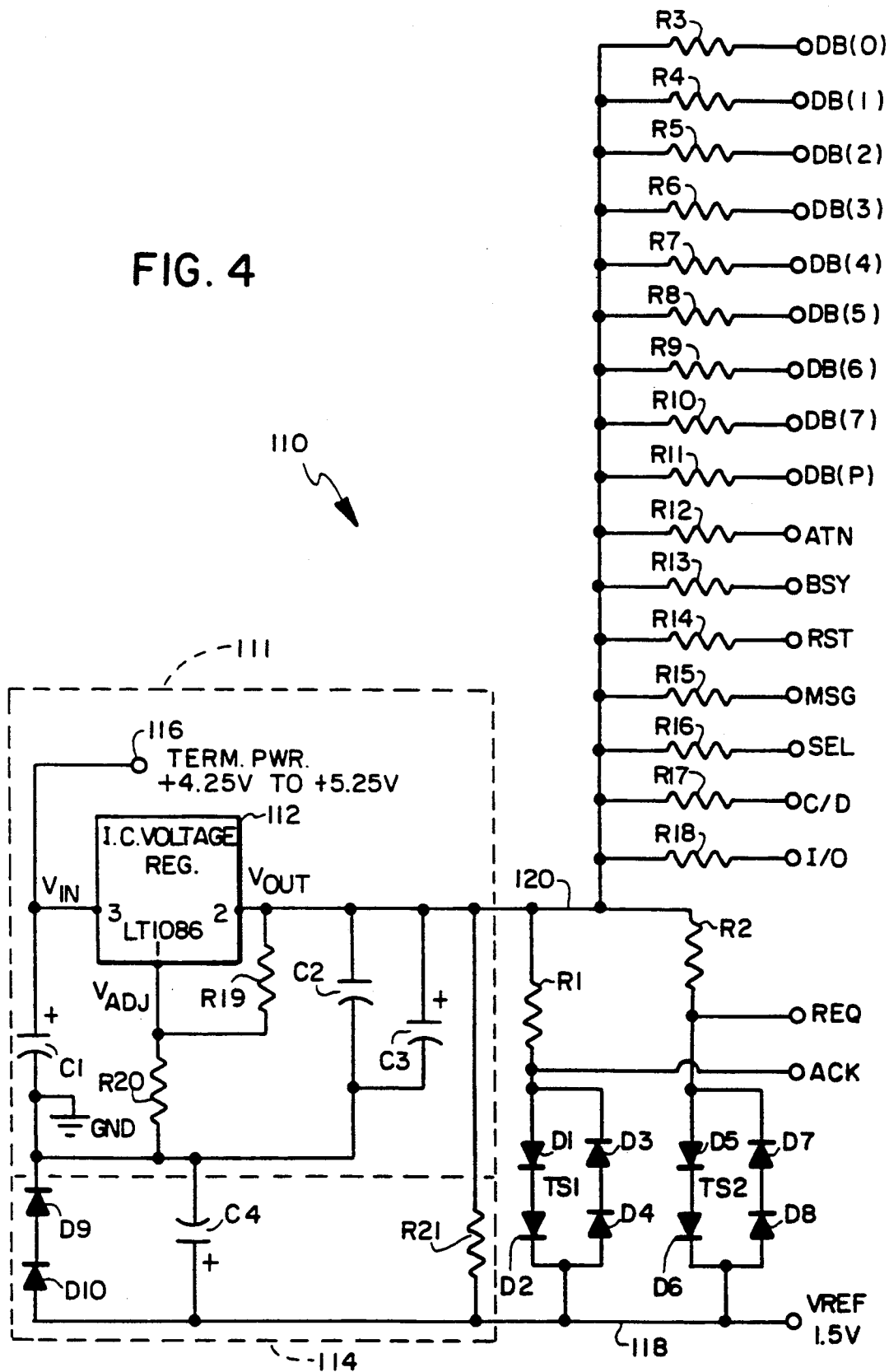
FIG. 4 is a detailed schematic circuit diagram of an improved terminator apparatus, constructed in accordance with the principles of the present invention.

Referring now in detail to the drawings, there is shown in FIG. 4 an improved signal line impedance matching (S.L.I.M) terminator apparatus 110 which is constructed in accordance with the principles of the present invention. The terminator apparatus 110 is adapted to be used with or is connected to ends of the SCSI bus line (such as bus line 14 in FIG. 1) for removing noise spikes or transients from data and/or control signals received on the bus line. The terminator apparatus 110 includes a voltage regulator 111 formed of an adjustable 3-terminal I.C. low voltage dropout regulator 112, such as LT1086CT, a low voltage regulating circuit 114, a plurality of pull-up termination resistors R1–R18, and transient suppression networks TS1 and TS2 for removing or attenuating transients or noise spikes.

The low voltage dropout regulator 112 has its input pin 3 connected to an input terminal 116 for receiving an input termination power supply voltage TERMPWR (Vin), which is typically at +5.0 volts but can be varied in the range of +4.25 volts to 5.25 volts in accordance with ANSI specification X3T9.2/86-109REV10c. The voltage regulator 112 has an output pin 2 for generating a regulated output voltage (Vout), which is typically at 2.85 volts. However, this output voltage can be adjusted to any value lower than +4.25 volts by selecting the values of series-connected resistors R19 and R20 which are coupled between the output pin 2 and a ground potential GND. The junction of the resistors R19 and R20 is connected to an adjustment pin 1 of the voltage regulator.

A capacitor C1 is connected between the input terminal 116 and the ground potential GND for shunting any low frequency noise appearing on the input termination power supply voltage TERMPWR to the ground potential. A capacitor C3 is connected between the output pin 2 of the voltage regulator and the ground potential GND for shunting any low frequency noise appearing on the output voltage Vout to the ground potential. A capacitor C2 is also connected between the output pin 2 and the ground potential GND for shunting any high frequency noise appearing on the output voltage Vout to the ground potential.

The low voltage regulating circuit 114 is comprised of a current-limiting resistor R21, diodes D9 and D10, and a capacitor C4. One end of the resistor R21 is connected to the regulated output voltage on the pin 2 of the voltage regulator, and the other end of the resistor R21 is connected to one end of the capacitor C4, to the anode of the diode D10, and to a reference line 118. The cathode of the diode D10 is connected to the anode of the diode D9. The cathode of the diode D9 is connected to the other end of the capacitor C4 and to the ground potential GND. The reference line 118 provides a reference voltage VREF for the suppression networks TS1 and TS2. Assuming that the forward voltage drop across the diodes D9 and D10 is each 0.75 volts, the reference voltage VREF is approximately +1.5 volts. Thus, the value of the resistor R21 is selected so that the current flowing through these diodes will produce the reference voltage of +1.5 volts at V reference.

Figure 2:
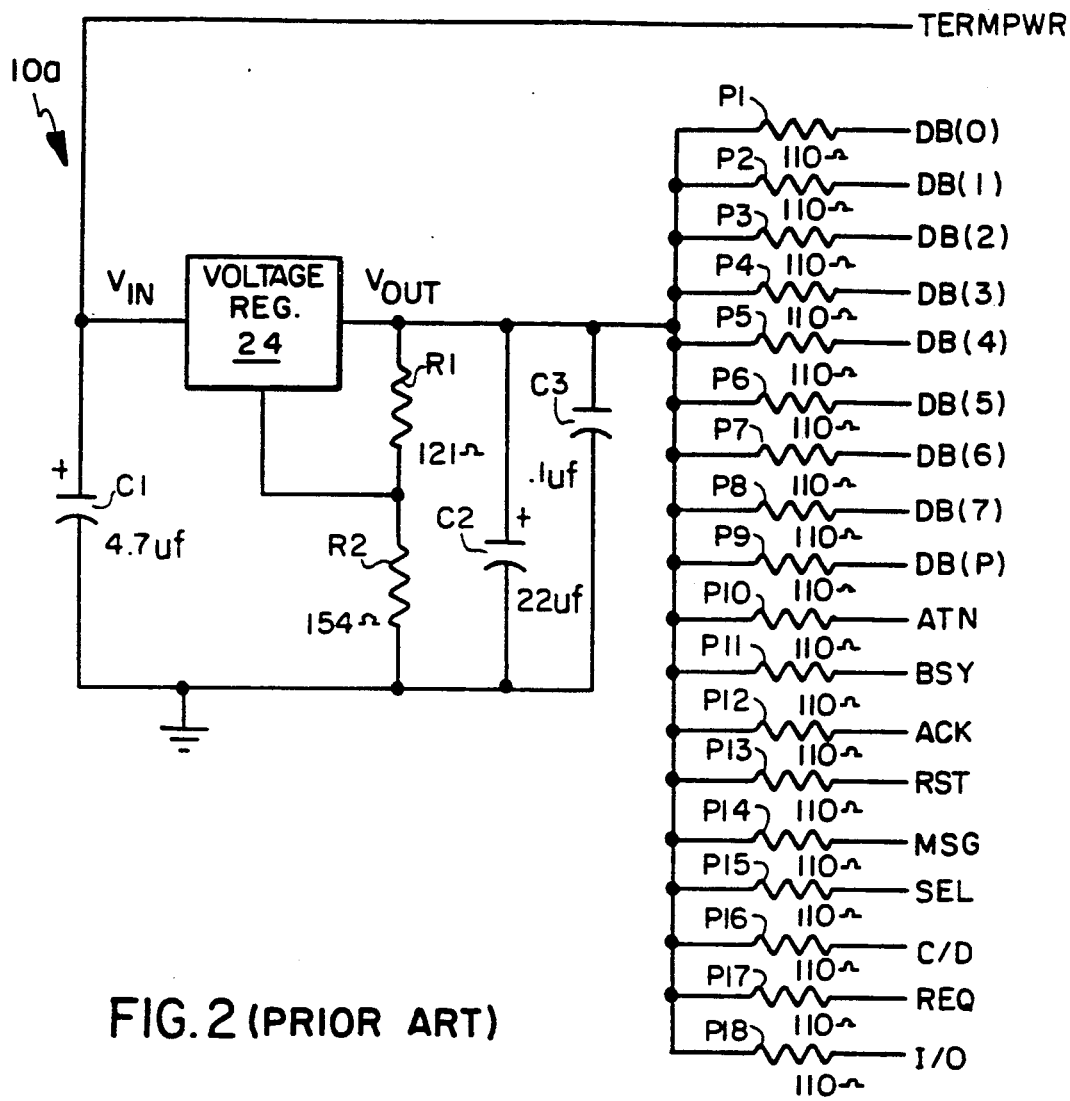
FIG. 2 shows another prior art terminator network.
Figure 3:
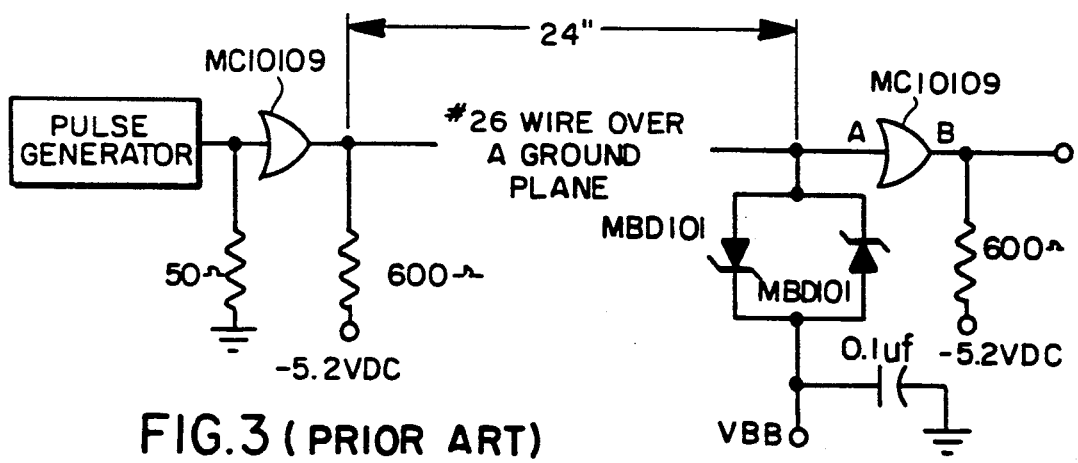
FIG. 3 shows a diode termination circuit of the prior art.

One end of each of the plurality of pull-up termination resistors R1 through R18 is commonly connected together and to the regulated output voltage on line 120. The other ends of the resistors R1 through R18 are connected to one end of the respective data and/or control signal lines ACK, REQ, DB(0) through DB(7), DB(P), ATN, BSY, RST MSG, SEL, C/D and I/O. The pull-up resistors R1 through R18 function in the same manner as the resistors P1–P18 in FIG. 2 of the prior art and serve to supply the current to a respective open collector transistor device formed in a corresponding transmitting device that is coupled to the SCSI bus line. In particular, when the open collector transistor device associated with the respective data and/or control signal lines is turned off, such signal line will be at a high or logic "1" level and no current will flow through the corresponding pull-up resistor. When the open collector transistor device associated with the respective data and/or control signal lines is turned on (signal line is active), such signal line will be at a low or logic "0" level and the maximum current through the open collector transistor device is limited by the corresponding pull-up resistor.

The transient suppression network TS1 is interconnected between the control signal line (ACK) and the reference line 118. The termination suppression network TS1 is a diode array formed of diodes D1 through D4. The anode of the diode D1 is connected to the cathode of the diode D3 and to the control signal line (ACK). The cathode of the diode D1 is connected to the anode of the diode D2. The anode of the diode D3 is connected to the cathode of the diode D4. The cathode of the diode D2 is connected to the anode of the diode D4 and to the reference voltage VREF on the line 118. The transient suppression network TS1 functions as a variable resistor which dynamically changes its impedance dependent upon the amount of current flowing therethrough.

Similarly, the transient suppression network TS2 is interconnected between the control signal (REQ) and the reference line 118. The transient suppression network TS2 is a diode array formed of diodes D5 through D8. The anode of the diode D5 is connected to the cathode of the diode D7 and to the control signal line (REQ). The cathode of the diode D5 is connected to the anode of the diode D6. The anode of the diode D7 is connected to the cathode of the diode D8. The cathode of the diode D6 is connected to the anode of the diode D8 and to the reference voltage VREF on the line 118. The transient suppression network TS2 functions likewise as a variable resistor which dynamically changes its impedance dependent upon the amount of current flowing therethrough.

It should be clearly understood to those skilled in the art that additional transient suppression networks similar to TSI could be connected between each of the other remaining signal lines and the reference line 118 so as to suppress transients. However, in order to reduce costs, the transient suppression networks are generally implemented only with the signal lines which are highly susceptible to transients. In other words, at least the control signal lines (ACK) and (REQ) being the most critical to reliable and accurate data transfer have been implemented with such transient suppression networks.

Figure 5:
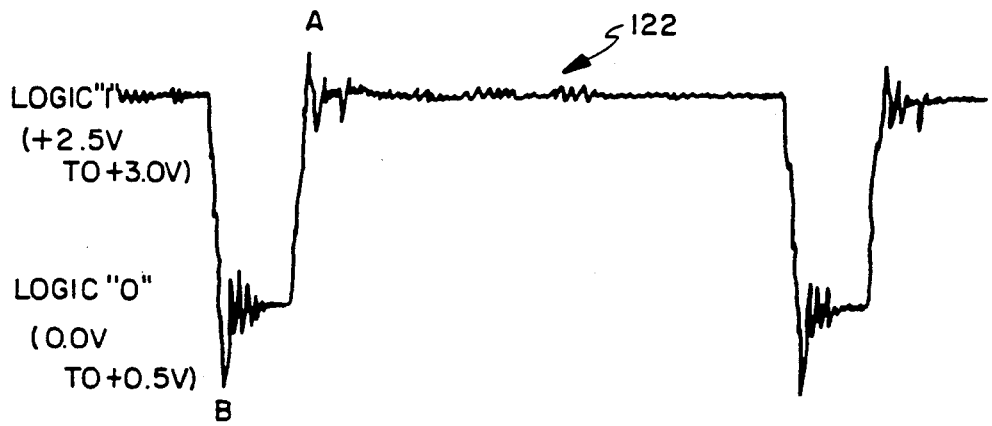
FIG. 5 is a waveform appearing on one of the signal lines in the prior art terminator network of FIG. 2, illustrating the noise spikes or transients that occur.

The operation of the present terminator apparatus 110 of FIG. 4 will now be explained with reference to FIGS. 5 and 6. In particular, FIG. 5 illustrates a waveform 122 of one of the signal lines in the prior art terminator network 10a of FIG. 2. As can be seen, when the signal line is at the high or logic "1" level (i.e., between ±2.5 to ±3.0 volts) there is a positive spike at point A extending above the high logic level. Also, when the signal line is at the low or logic "0" level (i.e., between 0.0 to 0.5 volts) there is a negative spike at point B extending below the low logic level. If these transients appearing at the points A and B are sufficiently long in duration and have large enough amplitudes, these transients could be interpreted by a receiving device coupled to the SCSI bus line as a valid signal. As a result, such transients may cause incorrect data to be transferred.

Figure 6:
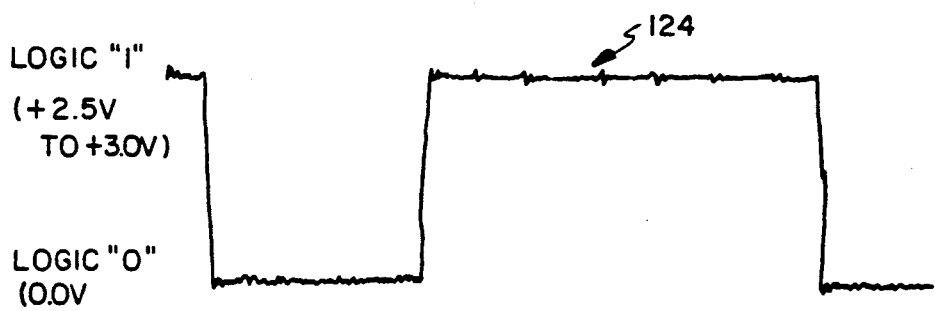
FIG. 6 is a waveform appearing on one of the signal lines in the terminator apparatus of the present invention, illustrating that the noise spikes or transients have been removed.

The improved terminator apparatus 110 in FIG. 4 of the present invention will remove or attenuate the transients appearing on the control signal lines REQ and ACK so as to produce the waveform 124 of FIG. 6. When the signal line (i.e., control signal line REQ) is at the high logic level and a transient appears like the one at the point A (FIG. 5) which exceeds the high logic level, the diodes D5 and D6 will be rendered conductive so as to clamp the control signal REQ to a voltage equal to two diode drops above the reference voltage VREF or approximately +3.0 volts, thereby effectively eliminating the transient. In other words, the diodes D5 and D6 limit the upper voltage level on the control signal line REQ.

When the control signal line REQ is at the low logic level and the transient appears like the one at the point B (FIG. 5) which falls below the low logic level, diodes D7 and D8 will be rendered conductive so as to clamp the control signal REQ to the low logic level or approximately zero volts. In other words, the diodes D7 and D8 limit the lower voltage level on the control signal REQ.

For completeness in the disclosure of the above-described terminator apparatus but not for purposes of limitation, the following representative values and component identifications are submitted. These values and components were employed in a terminator apparatus that was constructed and tested and which provides a high quality performance. Those skilled in the art will recognize that many alternative elements and values may be employed in constructing the circuits in accordance with the present invention.

| PART | TYPE or VALUE |
| --- | --- |
| C1 | 4.7 uF |
| C2 | .1 uF |
| C3 | 22 uF |
| C4 | 2.2 uF |
| R19 | 121 Ohms |
| R1-R18 | 110 Ohms |
| R20 | 154 Ohms |
| D1-D10 | BAV99 |

Therefore, with the above values used, the terminator apparatus 110 of the present invention will generally provide a regulated output voltage of +2.85 volts with a termination impedance of 110 Ohms which meets the maximum current specification. Further, the suppression networks TS1 and TS2 will remove any transients by limiting the range of the upper voltage level and the lower voltage level of the control signals REQ and ACK.

However, since it has been encountered in the computer equipment industry that many of the SCSI cables have a lower impedance than 110 Ohms and is more on the order of 80 Ohms, it would be desirable to easily modify the terminator apparatus 110 so as to accommodate the different impedances. It is merely needed to lower the regulated output voltage Vout so that the maximum current requirement is met when the termination impedances (R1-R18) are lowered to 80 Ohms. Accordingly, it has been discovered that the output voltage should be reduced to approximately +2.15 volts when driving an 80 Ohm termination impedance. Therefore, it will be apparent to those skilled in the art that the output voltage further can simply be adjusted to a desired value so as to accommodate the variety of different impedances of the SCSI cables.

From the foregoing detailed description, it can thus be seen that the present invention provides an improved terminator apparatus used with an SCSI bus line for removing noise spikes or transients from data and/or control signals received on the bus line. The terminator apparatus is comprised of a voltage regulator, a low voltage regulating circuit, a plurality of pull-up resistors, and suppression networks. The suppression networks serve to remove transients from the signal lines by limiting the range of the upper voltage level and the lower voltage level of the control signals appearing thereon.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A signal line impedance matching terminator apparatus used with a SCSI buss line for removing noise spikes or transients from data and/or control signals transferred on the buss line, comprising:
    voltage regulator means responsive to an input termination power supply voltage for generating a regulated output voltage of a predetermined value;
    low voltage regulating circuit means responsive to the regulated output voltage for generating a reference voltage;
    a plurality of pull-up termination resistors each having a first end and a second end, said first end of said plurality of pull-up termination resistors being connected to the regulated output voltage, said second end of said plurality of pull-up termination resistors being connected to a corresponding one end of a plurality of data and/or control signal lines, the other end of said plurality of data and/or control signal lines being coupled to the buss line, said plurality of pull-up termination resistors limiting the maximum current supplied when the signal lines are active; and
    suppression network means interconnected between at least one of said plurality of data and/or signal lines and the reference voltage for removing transients from the data and/or control signals by limiting the range of the upper voltage and the lower voltage level appearing thereon.

2. A terminator apparatus as claimed in claim 1, wherein said voltage regulator means comprises a 3-terminal I.C. voltage regulator.

3. A terminator apparatus as claimed in claim 2, wherein said voltage regulator includes means for adjusting the predetermined value of the regulated output voltage.

4. A terminator apparatus as claimed in claim 3, wherein said input termination power supply voltage is in the range of +4.25 volts to +5.25 volts.

5. A terminator apparatus as claimed in claim 4, wherein said adjustment means comprises a pair of series-connected resistors whose values are selected to determine the predetermined value of the regulated output voltage.

6. A terminator apparatus as claimed in claim 5, wherein said regulated output voltage is approximately +2.85 volts.

7. A terminator apparatus as claimed in claim 6, wherein said suppression network means is comprised of a first diode array.

8. A terminator apparatus as claimed in claim 7, wherein said first diode array is formed of first through fourth diodes, said first diode having its anode connected to the cathode of said third diode and to one of said plurality of signal lines, said second diode having its anode connected to the cathode of said first diode and having its cathode connected to the anode of said fourth diode and to the reference voltage, the cathode of said fourth diode being connected to the anode of said third diode.

9. A terminator apparatus as claimed in claim 8, wherein said suppression network means further comprises a second diode array formed of fifth through eighth diodes, said fifth diode having its anode connected to the cathode of said seventh diode and to another one of said plurality of signal lines, said sixth diode having its anode connected to the cathode of said fifth diode and having its cathode connected to the anode of said eighth diode and to the reference voltage, the cathode of said eighth diode being connected to the anode of said seventh diode.

10. A terminator apparatus as claimed in claim 6, wherein each of said plurality of pull-up resistors have a value of approximately 110 Ohms so as to limit the current to the SCSI bus line.

11. A terminator apparatus as claimed in claim 6, wherein said regulated output voltage is reduced to approximately +2.15 volts and wherein each of said plurality of pull-up resistors has a value of approximately 80 Ohms so as to match the SCSI bus line having a lower impedance but yet maintain the maximum current requirement.

12. A terminator apparatus as claimed in claim 1, wherein said at least one of said plurality of signal lines is associated with one of the control signals REQ and ACK.

13. A signal line impedance matching terminator apparatus connected to each of an SCSI bus line for removing noise spikes or transients from data and/or control signals received on the bus line, each of the terminator apparatus comprising:
    voltage regulator means responsive to an input termination power supply voltage for generating a regulated output voltage of a predetermined value;
    low voltage regulating circuit means responsive to the regulated output voltage for generating a reference voltage;
    a plurality of pull-up termination resistors each having a first end and a second end, said first end of said plurality of pull-up termination resistors being connected to the regulated output voltage, said second end of said plurality of pull-up termination resistors being connected to a corresponding one end of a plurality of data and/or control signal lines, the other end of said plurality of data and/or control signal lines being coupled to the bus line, said plurality of pull-up termination resistors limiting the maximum current supplied when the signal lines are active; and
    suppression network means interconnected between at least one of said plurality of data and/or signal lines and the reference voltage for removing transients from the data and/or control signal by limiting the range of the upper voltage and the lower voltage level appearing thereon.

14. A terminator apparatus as claimed in claim 13, wherein said suppression network means is comprised of a first diode array.

15. A terminator apparatus as claimed in claim 14, wherein said first diode array is formed of first through fourth diodes, said first diode having its anode connected to the cathode of said third diode and to one of said plurality of signal lines, said second diode having its anode connected to the cathode of said first diode and having its cathode connected to the anode of said fourth diode and to the reference voltage, the cathode of said fourth diode being connected to the anode of said third diode.

16. A terminator apparatus as claimed in claim 1, wherein said suppression network means further comprises a second diode array formed of fifth through eighth diodes, said fifth diode having its anode connected to the cathode of said seventh diode and to another one of said plurality of signal lines, said sixth diode having its anode connected to the cathode of said fifth diode and having its cathode connected to the anode of said eighth diode and to the reference voltage, the cathode of said eighth diode being connected to the anode of said seventh diode.

17. A terminator apparatus as claimed in claim 13, wherein said voltage regulator includes means for adjusting the predetermined value of the regulated output voltage.

18. A terminator apparatus as claimed in claim 13, wherein said at least one of plurality of signal lines is associated with one of the control signals REQ and ACK.

19. A terminator method used with an SCSI bus line for removing noise spikes or transients from data and/or control signals transferred on the bus line, comprising the steps of:
   generating a regulated output voltage of a predetermined value in response to an input termination power supply voltage;
   generating a reference voltage in response to the regulated output voltage;
   interconnecting a plurality of pull-up resistors between the regulated output voltage, the reference voltage and a plurality of data and/or control signal lines coupled to the bus line for limiting the maximum current supplied when the signal lines are active; and
   removing transients from the data and/or control signals responsive to the reference voltage in order to limit the range of the upper voltage level and the lower voltage level appearing on the data and/or control signal lines.

* * * * *